(12) United States Patent
Howarth et al.

(10) Patent No.: US 7,165,744 B2
(45) Date of Patent: Jan. 23, 2007

(54) TURBINE ENGINE ARRANGEMENTS

(75) Inventors: Nicholas Howarth, Derby (GB); Christopher Freeman, Nottingham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 11/036,360

(22) Filed: Jan. 18, 2005

(65) Prior Publication Data
US 2005/0211824 A1   Sep. 29, 2005

(30) Foreign Application Priority Data
Jan. 21, 2004 (GB) ................................ 0401189.6

(51) Int. Cl.
*B64D 27/00* (2006.01)
(52) U.S. Cl. ......................................................... 244/55
(58) Field of Classification Search ............. 244/53 R, 244/54, 55, 56, 12.4, 125, 23 A; 60/226.1, 60/228, 230; 239/265.17, 265.19, 265.23
See application file for complete search history.

(56) References Cited

U.S. PATENT DOCUMENTS

| | | | | | |
|---|---|---|---|---|---|
| 2,969,935 A | * | 1/1961 | Price | ........................... | 244/7 C |
| 3,031,155 A | * | 4/1962 | Kerry | ......................... | 244/12.1 |
| 3,045,953 A | * | 7/1962 | Eggers et al. | .................. | 244/52 |
| 3,064,923 A | * | 11/1962 | Reiniger | ..................... | 244/12.5 |
| 3,327,965 A | * | 6/1967 | Bockrath | ...................... | 244/54 |
| 3,442,471 A | * | 5/1969 | Fischer | ...................... | 244/53 R |
| 3,451,624 A | * | 6/1969 | Haberkorn et al. | .... | 239/265.33 |
| 3,480,236 A | * | 11/1969 | Nash | ......................... | 244/53 R |
| 3,542,295 A | * | 11/1970 | Rosiger et al. | ......... | 239/265.35 |
| 3,640,468 A | * | 2/1972 | Searle et al. | ............ | 239/265.29 |
| 3,658,279 A | * | 4/1972 | Robertson | ................. | 244/53 R |
| 3,747,875 A | * | 7/1973 | Stevens | .................... | 244/53 R |
| 3,773,280 A | * | 11/1973 | Buchstaller | ................... | 244/56 |
| 3,806,067 A | * | 4/1974 | Kutney | ...................... | 244/53 R |
| 3,809,178 A | * | 5/1974 | Manca et al. | ............... | 181/216 |
| 3,863,867 A | * | 2/1975 | Souslin et al. | ............. | 244/12.5 |
| 3,915,415 A | * | 10/1975 | Pazmany | ................. | 244/110 B |
| 3,940,092 A | * | 2/1976 | Farris | ......................... | 244/12.5 |
| 3,952,973 A | * | 4/1976 | James | .......................... | 244/54 |
| 3,972,490 A | * | 8/1976 | Zimmermann et al. | .... | 244/12.3 |
| 4,066,214 A | * | 1/1978 | Johnson | ................. | 239/265.19 |
| 4,301,980 A | * | 11/1981 | Bradfield et al. | .......... | 244/12.5 |
| 4,318,516 A | * | 3/1982 | Cole | ........................... | 244/54 |

(Continued)

FOREIGN PATENT DOCUMENTS

EP    0 115 914 B1    1/1987

(Continued)

*Primary Examiner*—Teri Pham Luu
*Assistant Examiner*—Stephen A Holzen
(74) *Attorney, Agent, or Firm*—Oliff & Berridge, PLC

(57) ABSTRACT

A fan turbine engine arrangement is provided in which a core engine is aligned such that an input of a nacelle is aligned with the upwash of a wing to which the arrangement is secured. The engine drives a fan such that bypass flows produced by the fan are guided by a duct to present a downward component for uplift. The core engine presents its output flow through a nozzle which is aligned with the fundamental axis Y—Y of the engine. In such circumstances, the bypass flows cross the core engine flow from the nozzle unless that engine is adjustable during operation in order to maintain alignment dependent upon lift requirements.

11 Claims, 3 Drawing Sheets

U.S. PATENT DOCUMENTS

| | | | |
|---|---|---|---|
| 4,449,680 A * | 5/1984 | Gratzer et al. | 244/130 |
| 4,449,681 A * | 5/1984 | Gratzer et al. | 244/130 |
| 4,449,682 A * | 5/1984 | Gratzer et al. | 244/130 |
| 4,449,683 A * | 5/1984 | Gratzer et al. | 244/130 |
| 4,456,204 A * | 6/1984 | Hapke | 244/53 R |
| 4,458,863 A * | 7/1984 | Smith | 244/54 |
| 4,474,345 A * | 10/1984 | Musgrove | 244/53 R |
| 4,560,122 A * | 12/1985 | Parkinson et al. | 244/54 |
| 4,603,821 A * | 8/1986 | White | 244/54 |
| 4,666,104 A * | 5/1987 | Kelber | 244/12.1 |
| 4,691,877 A * | 9/1987 | Denning | 244/6 |
| 4,721,271 A * | 1/1988 | Goldstein et al. | 244/75.1 |
| 4,722,357 A * | 2/1988 | Wynosky | 137/15.1 |
| 4,940,196 A * | 7/1990 | Lardellier | 244/54 |
| 5,039,031 A * | 8/1991 | Valverde | 244/12.2 |
| 5,058,617 A * | 10/1991 | Stockman et al. | 137/15.1 |
| 5,131,605 A * | 7/1992 | Kress | 244/56 |
| 5,261,227 A | 11/1993 | Giffin, III | |
| 5,277,382 A * | 1/1994 | Seelen et al. | 244/54 |
| 5,319,922 A | 6/1994 | Brantley | |
| 5,372,337 A * | 12/1994 | Kress et al. | 244/52 |
| 5,746,391 A | 5/1998 | Rodgers et al. | |
| 5,755,403 A * | 5/1998 | Marche | 244/54 |
| 5,775,638 A * | 7/1998 | Duesler | 244/54 |
| 6,009,985 A * | 1/2000 | Ivers | 188/380 |
| 6,095,456 A * | 8/2000 | Powell | 244/54 |
| 6,138,946 A * | 10/2000 | Saiz | 244/13 |
| 6,247,668 B1 * | 6/2001 | Reysa et al. | 244/58 |
| 6,568,633 B1 * | 5/2003 | Dunn | 244/59 |
| 6,729,575 B1 * | 5/2004 | Bevilaqua | 244/12.3 |
| 2002/0117581 A1 * | 8/2002 | Sanders et al. | 244/53 B |
| 2002/0158146 A1 * | 10/2002 | Lair | 239/265.19 |
| 2003/0183723 A1 * | 10/2003 | Bevilaqua | 244/12.5 |
| 2004/0004157 A1 * | 1/2004 | Liotta | 244/56 |
| 2004/0140397 A1 * | 7/2004 | Dun | 244/55 |
| 2005/0263643 A1 * | 12/2005 | Stretton et al. | 244/53 R |

FOREIGN PATENT DOCUMENTS

| | | |
|---|---|---|
| GB | 1 270 538 | 4/1972 |
| GB | 2 259 114 A | 3/1993 |
| GB | 2 275 308 A | 8/1994 |
| GB | 2 282 353 A | 4/1995 |
| WO | WO 99/60268 | 11/1999 |

* cited by examiner

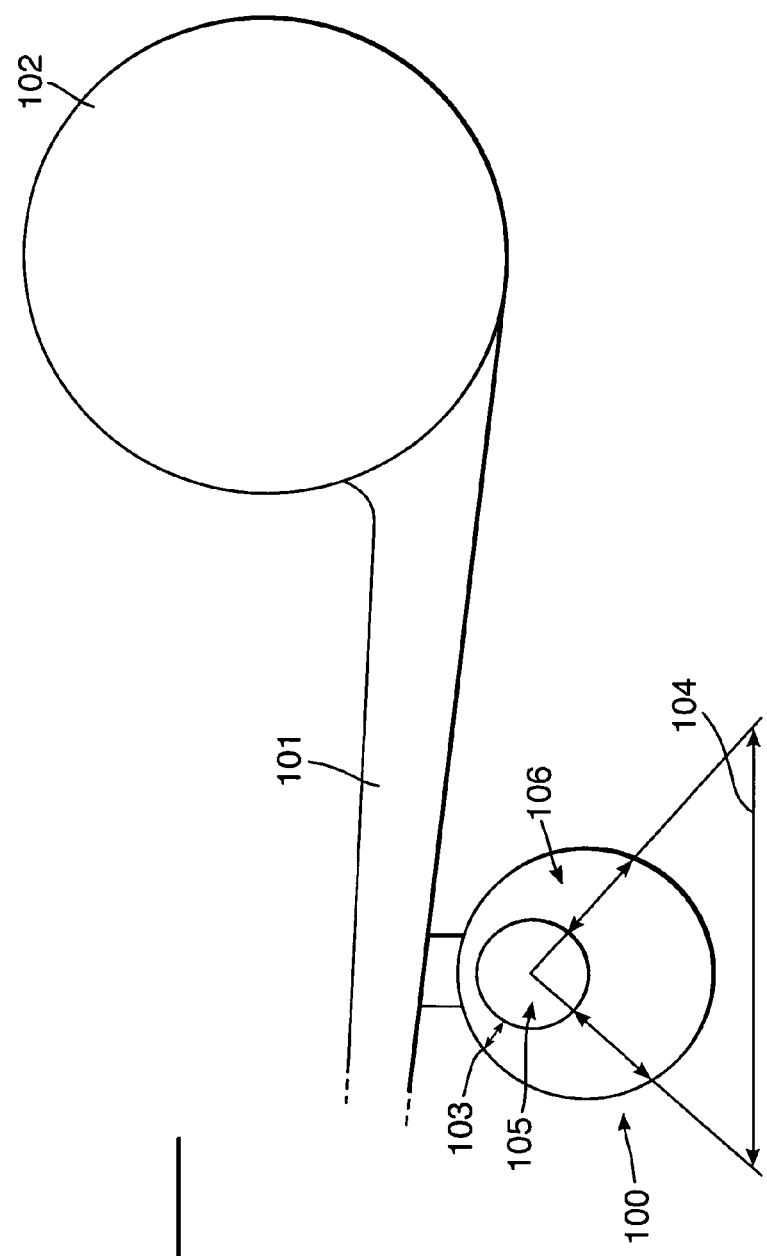

TURBINE ENGINE ARRANGEMENTS

BACKGROUND

The present invention relates to turbine engine arrangements and more particularly to engines used with aircraft to provide propulsion.

Use of turbine engines to provide propulsion for aircraft is well known. The turbine engine provides thrust or movement of the aircraft and traditionally as shown in FIG. 1 an engine A is located within a nacelle B whereby the principal axis of the engine X—X is positioned in order to optimise aircraft performance in terms of fuel economy. Thus, thrust from the engine is in the direction of arrowhead C which is angled relative to the axis of motion (arrow J) in order to achieve best lift to drag characteristics. This relationship requires that the inlet duct D along with the nacelle B and hot/cold nozzle vectoring is orientated as shown in FIG. 1. In such circumstances, as can be seen in FIG. 1 there is a slight turn in the input flow in the direction of arrowheads E and E' in order to align with the engine axis X—X. This turning diminishes performance.

The current practice depicted in FIG. 1 aligns the engine axis X—X which generates a proportion vector in the direction of arrowhead C which has a component of lift in a proportion that achieves best lift to drag ratios when in combination with an associated airframe F. Thus to provide the most favourable pressure intake performance recovery requires a scarfed (i.e. angled) front inlet duct D to the nacelle B in order to align the upwash in the front of a leading edge H of a wing G. This upwash is fundamental to a subsonic wing and exists to differing extents at almost all non aerobatic phases of flight. This scarfed inlet comprises a front end of the nacelle B which turns the airflow E in the direction of arrowhead E' (dashed lines) into alignment with the engine axis X—X. Such turning of the airflow E in the direction of arrowhead E' creates a pressure loss in the airflow into the engine A and so reduces efficiency.

SUMMARY

In accordance with the present invention there is provided a turbine engine arrangement comprising a nacelle defining an inlet duct and a final mixing nozzle, a turbine engine disposed in a flow path between the inlet duct and the final mixing nozzle, the arrangement secured to an aircraft wing. The engine includes a fan and a core engine that rotate about a principal rotation axis of the engine, and the principal rotation axis is aligned with an upflow of air to the wing to avoid a turning of an inlet flow in the inlet to pass through the engine. The final mixing nozzle and a core exhaust nozzle are angled downwardly relative to the principal rotation axis of the engine to provide a flow of air that has an overall component of lift, the core exhaust nozzle being encompassed within the final mixing nozzle.

Preferably, alignment of the engine rotational axis is inclined towards a plane of the inlet duct.

Preferably, alignment of the engine is with the engine substantially perpendicular to the input duct.

Normally, the nacelle is secured to the wing through a pylon. Typically, the pylon is configured to allow positioning of the nacelle with greater clearance relative to a leading edge of a wing to allow increased fan diameter and/or further displacement of the flow from the engine from the wing.

Typically, the engine has a final mixing nozzle such that the output flow is appropriately directed vectorally for efficient lift operation.

Alternatively, the engine is adjustable mounted within the nacelle via mountings to maintain alignment with the upwash flow to the wing.

Preferably, the alignment of the engine with the upwash flow of air to the wing is parallel to the rotational axis of the engine.

Generally, the angle of upflow relative to a direction of motion of the wing is between 0° and 10°.

Generally, the angle between the final mixing nozzle and the flow through the engine is between 0° and 4°.

Generally, the angle between the core exhaust nozzle and the flow through the engine is between 0° and 4°.

BRIEF DESCRIPTION OF THE DRAWINGS

An embodiment of the present invention will now be described by way of example only with reference to the following:

FIG. 4 is a graphic representation illustrating lift against drag in comparison with angle of incidence; and, FIG. 5 is a schematic rear view of an engine associated with a wing and in particular nozzle orientations with respect to noise generation from that engine.

DETAILED DESCRIPTION OF EMBODIMENTS

Figure 2:
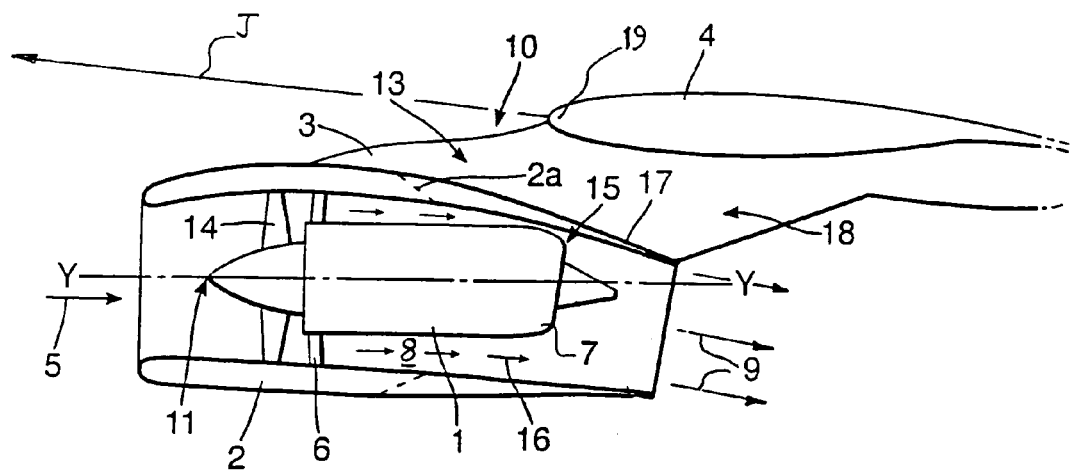
FIG. 2 illustrating a schematic cross-section of a turbine engine arrangement in accordance with the invention.

Referring to FIG. 2 in which an engine 1 is located within a nacelle 2 which in turn is secured through a pylon 3 to a wing 4 of an aircraft. The engine 1 is a turbo fan which is arranged for optimisation of exhaust duct/nozzle design to allow the turbine machinery axis Y—Y of the engine 1 to lie closer to the optimum vector with respect to inlet airflow in the direction of arrowhead 5 to be achieved. The engine 1 is secured through mountings 6 to present the engine 1 perpendicular to the inlet flow 5 at cruise. In such circumstances, there is no turn in the inlet flow 5 prior to flow through the engine 1 and so reduces inefficiency caused by such turning in the inlet flow 5. Thus, the inlet flow 5 is propelled through the engine 1 and exhausted through an outlet core nozzle 7 and bypass duct 8 along with a final mixing nozzle 17. This bypass duct 8 creates an inclined thrust direction depicted by arrowhead 9 which provides a component of lift. In such circumstances, an engine arrangement 10 in accordance with the present invention achieves optimal alignment of the incident air in the direction of the inlet flow 5 through the engine 1 and optimal thrust vector for lift to drag ratio in the direction of arrowheads 9.

The engine 1 and in particular the turbine machinery are aligned with the inlet flow or upwash 5 created by the wing 4. Thus, air flow at the inlet duct 11 is subjected to no turning such that there is higher recovery and fan 14 stability due to even presentation of the inlet flow 5 to the turbine machinery.

At the core nozzle 7 and the final mixing nozzle 17 of the arrangement 10 as indicated previously a vertical component is provided in the exhaust flow 9. This vertical component is achieved through appropriate vectoring of the bypass duct 8 and core nozzle 7 along with final mixing nozzle 17. This vectoring may vary through displacement of surfaces in the bypass duct 8 or core nozzle 7 to achieve best lift performance.

Figure 1:
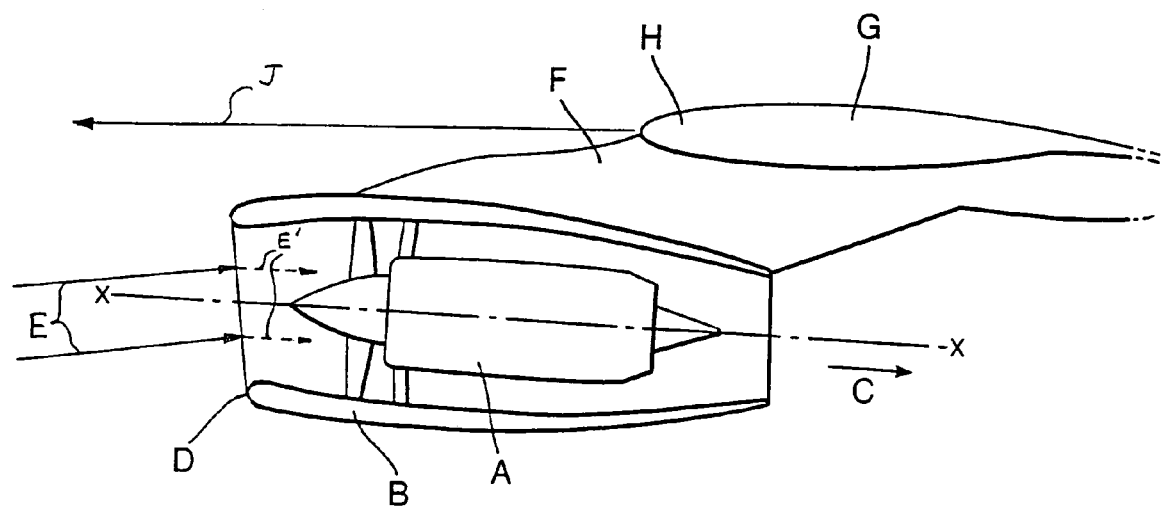
FIG. 1 is a schematic cross-section of a traditional turbine engine arrangement.

The vectored nacelle 2 allows increased clearance in a pylon portion 13 in comparison with conventional previous arrangements as depicted in FIG. 1. Thus, greater turbo fan 14 diameters can be accommodated for available fixed ground clearance of the wing 4 relative to the ground. The pylon 3 at a rear portion 18 presents the bypass duct 8 of the nacelle 2 further from the wing 4. In such circumstances, there is reduced interference drag with increased wing efficiency.

The bypass duct 8 at an upper portion may be impinged by hot gas flows from the core nozzle 7. Thus, hot gas flows from in particular an upper part 15 of the core nozzle 7 may penetrate the outer bypass duct 8 to provide propulsion. Such an arrangement would allow re-energisation of flow boundary layers created in the pylon 3 and the outer surfaces of nacelle 2.

In summary, the engine arrangement 10 depicted in FIG. 2 provides the advantages of improved inlet flow 5 efficiency through eliminating turning in the flow as presented to the engine 1 and in particular the fans 14, improved clearance for the wing 4 and in particular a leading edge 19 of that wing, the ability to provide greater fan 14 diameters for a given airframe geometry and reduced nacelle 2/wing 4 interference drag.

The present invention utilises aligning of the engine 1 to the upwash of the wing 4 whilst achieving a vertical component for lift in the outlet flow 9 through appropriate angling vectors for the bypass duct 8/final mixing nozzle 17 in association with the outlet nozzle 7 of the engine 1. The objective is to provide substantial alignment of the inlet duct 11 with the upwash throughout operation. In such circumstances, in normal operation it will be appreciated that fuel load diminishes as fuel is burnt to provide propulsion in the engine 1. In such circumstances, lift requirements are reduced and the angle of attack required by the wing 4 alters and the lift to drag ratios change.

The ultimate thrust vector angle for the exhaust flow 9 may be given by designing the wing in conjunction with the engine installation. Wing lift may be reduced by providing a delta lift from the thrust vector.

Figure 3:
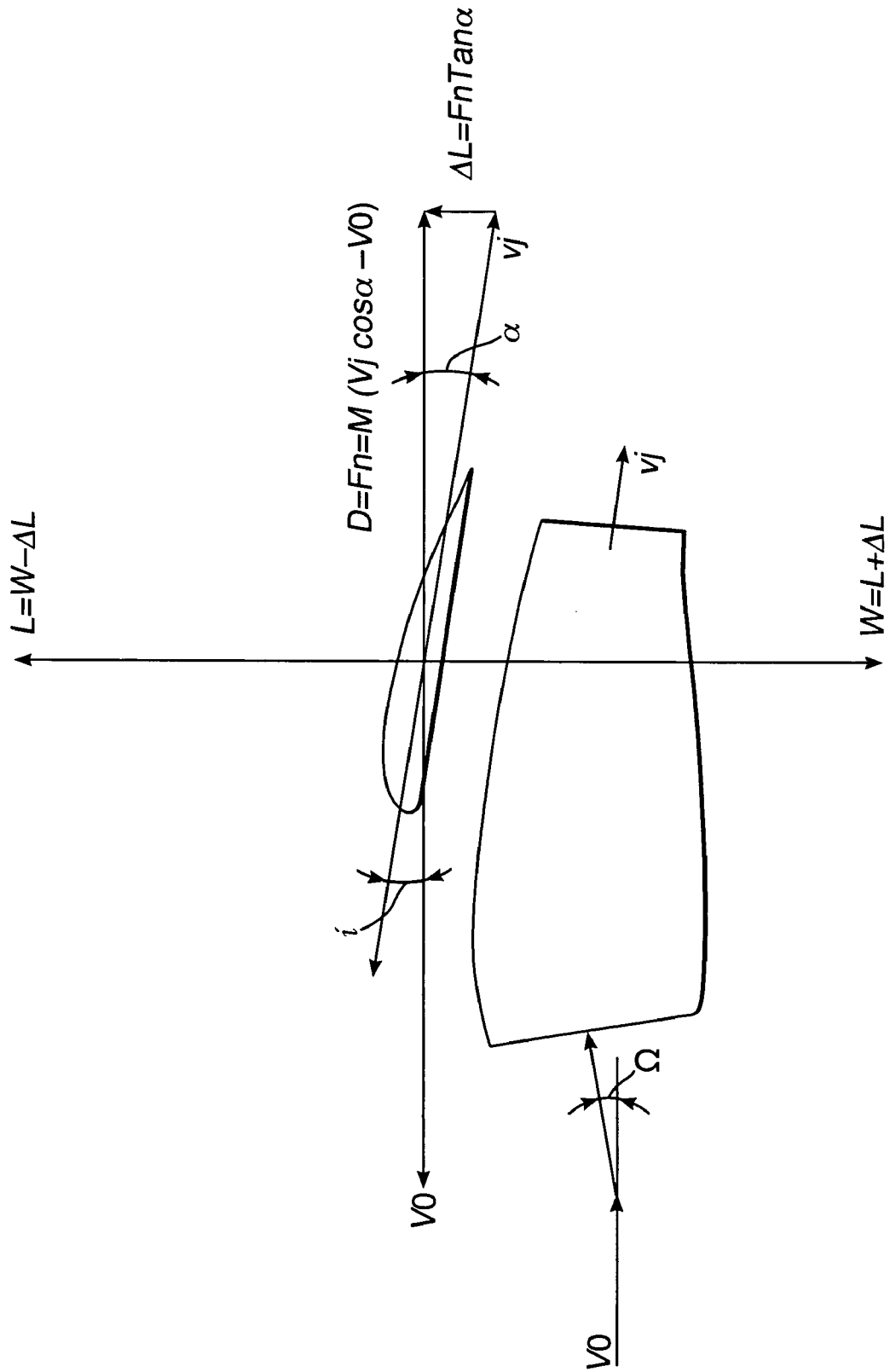
FIG. 3 is a schematic illustration showing the interrelationships of thrust, lift and drag upon an engine associated with a wing.

FIG. 3 provides further details of delta lift in the thrust vector by way of a schematic diagram. FIG. 3 illustrates the relationships in particular between lift vector delta L, nett thrust Fn and drag D. Thus, delta $L = Fn \tan \alpha$ $Fn = D$ $D = M (Vj \cos \alpha - VO)$ where Fn=nett thrust L=lift D=drag W=weight M=mass flow Vj=jet velocity VO—flight velocity ΔL=delta lift α=thrust vector angle (typically 0–4 degrees f(i)) in steady state i=angle of incidence (typically 0–15 degrees f(mach)) in steady state Ω=upwash angle (typically 0–10 degrees f(i) and f(mach)) in steady state It will be noted that an upwash 5 is caused by the presence of a subsonic wing approaching the normally stationary atmosphere. This reduces the pressure field above the wing and induces a vertical component in the atmosphere prior to the wing's arrival. In such circumstances it will be appreciated that the relationships $L = W - \Delta L$ $W = L + \Delta L$ define the equilibrium condition with respect to suspension of the wing and engine and associated aircraft fuselage in use. The object of the present invention is to create a better balance whereby ΔL is set such that W is substantially equivalent to lift whilst the engine thrust, and hence fuel burn, is optimised in sympathy with the wing performance. Reduced wing lift means less drag which means less thrust in the direction of the flight vector VO. The optimisation lies in defining the additional thrust required in the direction of the thrust vector. More delta lift leads to less thrust required in the flight direction but more in the thrust vector direction. A differential equation(s) expressing the specific wing and engine performance(s) must be solved to minimise fuel burn such that the optimum thrust vector angle for each application may be defined. As a flight progresses, fuel is burnt and lift requirements change. To satisfy lower lift at a known mach number it will be understood that the wing incidence, i, is reduced. It may be observed from FIG. 4 that this may move the wing performance away from optimum L/D. To counter this the thrust vector should be altered accordingly. In accordance with the present invention this ultimate thrust vector is achieved by altering the bypass duct 8 and either nozzle 7 or 17 either individually or relatively to achieve appropriate alignment for the desired thrust vector as a proportion of the exhaust flow 9. Such alterations in the duct 8 and nozzle 7 will typically be achieved through hydraulic ram or other mechanical activation means (see U.S. Pat. No. 5,746,391, EP0115914, GB481320, GB1270538, GB2275308). The exhaust nozzle 17 may comprise a number of individual petals displaced in order to create the desired output flow 9 vectoring to achieve the desired thrust angle. A mechanically simpler arrangement may be realised by the use of fixed ducts or nozzles aligned to a best compromise angle. It will equally be appreciated that as the angle of incidence changes both the upwash angle of the air approaching the wing and the angle of the inlet duct 11 relative to the upwash will change. To allow the inlet duct 11 and turbo machinery 14 to remain aligned with the inlet airflow, the engine 1 may be tilted on the mounting 6, again by hydraulic or other mechanical means.

By providing the core engine 1 in substantial alignment with the uplift flow as indicated above, there is no turning in the inlet flow 5 presented to the fan(s) 4 of the engine 1 as well as in the flow through the engine 1 such that the engine 1 can operate to high efficiency. The present invention utilises an external bypass duct 8 in order to create the necessary optimum thrust vector, that is to say a vertical component in the outflow 9 for lift. The core engine 1 provides, through its core nozzle 7 and final mixing nozzle 17, a gas flow which is controlled and deflected for lift performance. Bypass airflows illustrated as arrowheads 16 created by the fan 14 in FIG. 2 are gently turned by the inner casing surfaces of the nacelle 2 such that these flows 16 have the vertical component necessary for an optimum thrust vector. Typically, if the core engine 1 is fixed in its axial presentation to optimise alignment between the inlet flow 5 and the fan 14 along with engine 1 then these bypass airflows 16 when guided by an upper rear portion of the final mixing nozzle 17 of the bypass duct 8 will impinge and cross the core engine 1 jet stream propelled in the direction of the principal axis Y—Y. In such circumstances, in addition to providing the vertical flow component for the flow 9 these bypass flows 16 may mask the more noisy direct jet stream from the core engine 1 through the nozzle 9 to more acceptable noise levels.

FIG. 5 provides a schematic rear view of an engine 100 secured to a wing 101 which in turn is attached to an aircraft fuselage 102. In such circumstances it will be appreciated that an upper section 103 of the exhaust gas flow has a higher mean jet velocity due to a larger proportion of the exhaust area occupied by faster hot jet flows in comparison with an area 104 in the lower arc where a lower specific thrust than in the top arc 103 is experienced. This consequent lower mean jet velocity creates noise variation. It will be understood that there is a hot nozzle 105 and a cold nozzle 106 for providing differential exhaust gas flow temperatures and as indicated flow rates. As indicated the present invention allows the bypass flows from the cold nozzle to mask the noisier direct jet stream from the core taken from the hot nozzle 105. The present engine arrangement 1 allows efficient operation of the fan 14 in terms of inlet flow 5 alignment whilst with the upwash angle whilst still achieving a vertical component of velocity at exhaust 17 through the duct 8 acting upon the bypass 16 and core 1 flows.

Use may also be made of the vectoring features, both nozzle/duct and adjustable engine mounting features, to actively position the engine/exhaust to minimise noise footprint, especially for take off.

In an alternative embodiment of the present invention the nacelle 2 may be shortened or truncated as shown by broken line 2*a*.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A turbine engine arrangement comprising:
    a nacelle defining an inlet duct and a final mixing nozzle;
    a turbine engine disposed in a flow path between the inlet duct and the final mixing nozzle, the arrangement secured to an aircraft wing,
    wherein the engine includes a fan and a core engine that rotate about a principal rotation axis of the engine,
    wherein the principal rotation axis is aligned with an upflow of air to the wing to avoid a turning of an inlet flow in the inlet to pass through the engine, and
    wherein the final mixing nozzle and a core exhaust nozzle are angled downwardly relative to the principal rotation axis of the engine to provide a flow of air that has an overall component of lift, the core exhaust nozzle being encompassed within the final mixing nozzle.

2. The arrangement as claimed in claim 1, wherein an alignment of the engine includes the fan and the core engine being substantially parallel to a plane of the inlet duct.

3. The arrangement as claimed in claim 1, wherein an alignment the engine includes the rotational axis of the engine being substantially perpendicular to a plane of the inlet duct.

4. The arrangement as claimed in claim 1, wherein the nacelle is secured to the wing through a pylon.

5. The arrangement as claimed in claim 4, wherein the pylon is configured to allow positioning of the nacelle with greater clearance relative to a leading edge of wing to allow at least one of an increased fan diameter and further displacement of the air flow through the engine from the wing.

6. The arrangement as claimed in claim 1, wherein the final mixing nozzle provides outlet flow that is appropriately directed vectorally for efficient lift operation.

7. The arrangement as claimed in claim 1, wherein the engine is adjustably mounted within the nacelle via mountings to maintain alignment of the engine with the upflow of air to the wing.

8. The arrangement as claimed in claim 1, wherein the alignment of the engine with the inlet flow is parallel to the principal rotational axis of the engine.

9. The arrangement as claimed in claim 1, wherein an angle of the inlet flow relative to a direction of motion of the wing is between 0° and 10°.

10. The arrangement as claimed in claim 1, wherein an angle between the final mixing nozzle and the air flow through the engine is between 0° and 4°.

11. The arrangement as claimed in claim 1, wherein an angle between the core exhaust nozzle and the inlet flow through the engine is between 0° and 4°.

* * * * *